United States Patent Office 3,740,264
Patented June 19, 1973

3,740,264
FIREPROOFING CELLULOSE WITH COMPLEXES OF HEAVY METAL SALTS OF ACID PHOSPHATE ESTERS
Charles Andrew Lynch, Jr., Severna Park, and Edward Francis Orwoll, Baltimore, Md., assignors to FMC Corporation, New York, N.Y.
No Drawing. Original application Mar. 27, 1970, Ser. No. 23,479. Divided and this application Dec. 15, 1971, Ser. No. 208,504
Int. Cl. C09k 3/28
U.S. Cl. 117—136
5 Claims

ABSTRACT OF THE DISCLOSURE

Compositions which are water-soluble ammonia complexes of heavy metal salts of acid phosphate organic esters, the organic groups containing an average of at least three carbon atoms, are used in water solutions to produce weather-resistant flame-retarding treatments for wood and other cellulosic bodies. The organic moieties are preferably chlorinated or brominated to improve their flame retardance.

BACKGROUND OF THE INVENTION

This is a division, of application Ser. No. 23,479, filed Mar. 27, 1970 now Pat. No. 3,678,086.

The problem of producing cellulose structures which are nit readily combustible has been the subject of much study for many years. The problem is how to get a fire-retardant material into the cellulose, at a sufficiently low price to warrant the advantage gained, without sacrifice of the desired properties of the cellulose structure, such as strength and appearance. In addition, where the cellulose is exposed to the weather, as with wood in structural applications and cotton cloth when used for tents and tarpaulins, the flame-retarding agent must survive the hazards of weathering.

Both the phosphate radical, and the halogens chlorine and bromine, have well-known utility in flame-retarding compositions, having been extensively used for that purpose, separately and in combination. In addition, the utility of heavy metal salts of phosphoric acid is well known. The problem has always been to combine these, and other materials with fire-retarding properties, into combinations which meet the requirements of low cost—including both original cost and that of application—with utility for the desired end result.

Organic esters of phosphoric acid—e.g. tricresyl phosphate—are known to impart flame-retarding properties to compositions in which they are included, and more so when the organic moieties are halogenated with chlorine or bromine. And metal and other salts of mono- and/or di-acid phosphate esters have been used for their combination of flame retardance and plasticizing properties—see Tattersall U.S.Pat. 2,202,124, who used such salts of dimethyl phosphoric acid as a combined flame retarder and plasticizer for nitrocellulose, or Harrington, Jr. et al. U.S. Pat. 2,933,402, who used heavy metal salts of bis($\beta$-chloroethyl)phosphoric acid for similar purposes in cellulose acetate filaments. Similar salts have also been used in lubricants—see for example Asseff et al. U.S. Pat. 2,916,906 and Bonmartini et al. U.S. Pat. 3,000,821.

While the literature teaches that the metal salts of acid phosphate esters would impart filame retardance to cellulose structures, attempts to use them have given poor results. The cost of application in organic solvents, and the general poor weather resistance of the salts suggested by Tattersall and Harrington, Jr., have discouraged further experimentation.

SUMMARY OF THE INVENTION

We have discovered that heavy metal salts of acid phosphate esters can be used economically ot give weather-resistant fire retardance to cellulose structures such as wood and cotton cloth, by making new compositions which are ammonia complexes of heavy metal salts of acid phosphate esters in which 1 to 2 hydrogens are available for each phosphorus to form salts, and the organic ester groups have an average of at least 3 carbon atoms per ester group where a halogen is present and 4 where there is no halogen. The upper limit for carbon atoms in the ester groups depends on the nature of the ester groups, and the degree and type of halogenation. For alkyl groups, the upper limit can be expressed as C atoms—Cl atoms—2(Br) atoms=6 for aryl groups,

C atoms—Cl atoms—2(Br) atoms=10

The complexes are dissolved in water, and the solutions are used to impregnate cellulose structures. The structures are then dried at temperatures high enough to drive off the ammonia; air drying is sufficient, but low heats are preferred to hasten processing.

DESCRIPTION OF THE INVENTION AND THE PREFERRED EMBODIMENTS

In practicing the instant invention, the starting material is an acid phosphate ester, in which 1 to 2 of the 3 active hydrogens of phosphoric acid are replaced by the residue of an alcolol or phenol. The choice of organic radicals of the esterifying hydroxy compound is limited by the necessity that the final composition be both resistant to leaching by water, and act as a flame retardant.

Unsubstituted or alkoxy-substituted alkyl radicals used in the ester should average at least 4 carbon atoms to ensure proper resistance to weathering, and cannot average more than 6 carbons; above this figure, fire retardance imparted by the metal phosphate portion of the composition is offset by the carbon-hydrogen content of the alkyl groups. However, if the alkyl groups are halo-substituted by chlorine or bromine, 3 carbon atoms is the lower limit, and more carbon can be tolerated at the upper limit. A formula which can be used for calculating the permitted maximum carbon in alkyl ester groups is C atoms—Cl atoms—2(Br) atoms=6

With aryl compounds, the formula is approximately

C atoms—Cl atoms—2(Br) atoms=10

The acid phosphate esters can be prepared by a variety of known methods. These include (1) hydrolysis of complete phosphate esters, or of alkyl or aryl phosphorochloridates; (2) dehydration of mixtures of alcohols and phosphoric acid to produce monoesters; (3) reaction of polyphosphoric acid with an alcohol or a phenol to produce chiefly monoester; and (4) reaction of an alcohol or phenol with $P_2O_5$ to produce a roughly equimolar mixture of mono- and diester. We prefer this last method, since it is by far the most economical.

Halogenated esters can be prepared from halogenated alcohols or phenols, or the acid ester can be halogenated.

The partial esters are then reacted with a heavy metal compound which will form a complex with ammonia. A great many metals will do so, but while they are theoretically useful, they are not economically useful on cost considerations—e.g. cobalt, nickel, tellurium, ruthenium, silver, cadmium, rhenium, osmium, iridium, palladium, gold, and mercury (although a very minor amount of mercury is useful if wood is to be protected against fungi as well as against flame). Economically sound metals include iron, chromium, manganese, copper, zirconium, and zinc. The last two give treatments with minimum color, and are consequently preferred, with zinc being the metal of choice on economic grounds. Copper, being an effective anti-fungal agent, is a metal of choice, despite its color, because of this dual role.

The salts may be conveniently prepared by reacting the acid esters with metal oxides, hydroxides, sulfides, or carbonates of the metal, or by double decomposition of salts—e.g.

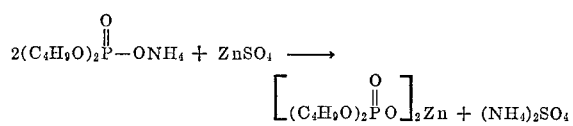

After salt formation, complexing is done by adding sufficient ammonia to form the water-soluble complex.

Impregnation of articles to be treated can be done in a variety of ways, and there are many variables. Some of these variables are:

(1) Concentrations and amounts.—The amount of salt to be deposited within the treated article based on dry weight of the article is highly variable. In the case of fire retardants, the amount is fixed on economic grounds which is variable depending upon service required. Articles having a relatively high surface/volume ratio will require higher rates of application than massive articles. Impregnations to gain preservative properties may require a smaller concentration of salt than for flame retardant properties.

Having fixed the amount of salt desired per unit weight of the article to be treated, the concentration in the impregnating solution will vary with the absorptivity of the article, depth of treatment desired, and application method. Thus, pressure or vacuum impregnation may require a lesser concentration than dipping, in turn less than surface spraying.

In vacuum treatment of shingle strips, absorptivity varied from 50 to 150 percent of the shingle weight. Impregnating solution concentrations varied from 15.5 to 2 percent. Impregnation levels of dry salt in dry shingle varied from 1 to 20 percent.

(2) Temperature.—Impregnation has been accomplished primarily at room temperature. Warmer temperatures will increase solubility of the salt, and accelerate the impregnation process. Temperature during impregnating and drying, however, should not exceed 70° C., above which strength and properties of the treated article may be affected.

(3) Pressure.—Application of vacuum and pressure may be applied to aid impregnation. Similarly, the treated article may be vacuum dried to remove water and released ammonia.

(4) Time.—There are no process reasons for strictly specifying time, other than reasons of economic productivity.

(5) Equipment.—Dipping vessels, pressure impregnating vessels, and driers are used for impregnations in industry. Design details of processing equipment are not a part of this invention.

Once the desired impregnation has been accomplished, water is removed from the impregnated articles by air drying, as by blowing currents of air, by heat, or by combination of air currents and heat.

It is important that the water and complexing agent be removed, or the treatment will not withstand weathering.

We have impregnated various wooden articles such as shingles, siding, two-by-fours, and other structural elements, as well as tenting canvas and other textiles, with varying concentrations of complex. Obviously, flame retardance is improved with increasing levels of additives, all things being equal.

Both chlorine substitution, and particularly bromine substitution in the esters, contribute markedly to improvement of flame retardance; where low levels of pickup are desired for mechanical reasons, best results are obtained with halogenated esters. The utility of these halogens for this purpose is of course well known.

EXAMPLES

The following examples of the invention are given by way of illustration and not by way of limitation:

EXAMPLE 1

A 3-liter flask was equipped with a pot thermometer, condenser, stirrer, and $P_2O_5$ adding device comprising a 1-liter Erlenmeyer flask connected to the flask side-arm by means of wide bore tubing with a clamp to regulate the $P_2O_5$ addition rate. n-Butanol (777 grams, 10.5 moles) was charged into the flask, which was purged with nitrogen and cooled in an ice bath. The $P_2O_5$ (497 grams, 3.5 moles) was added in 105 minutes at 35–50° C. The mixture was heated to 70°, held at 70° for 15 minutes, then allowed to cool to room temperature. The product was a slightly amber slightly turbid solution. Its equivalent weight to the phenolphthalein endpoint was 143.

One equivalent (143 grams) of mono/dibutyl phosphoric acid was dissolved in 369 grams water and 59 grams (1.0 mole) of concentrated $NH_4OH$ to produce 571 grams of ammonium salt solution. Cupric sulfate solution (400 grams of 20 percent solution, 0.5 mole) was added in 40 minutes at 28–31° C. to produce a pale blue slurry of the cupric salt. Two moles of concentrated $NH_4OH$ (117 grams) was added but failed to dissolve the precipitate completely. Of the 1088 grams of slurry, 84 grams was removed for solubilization experiments. The addition of 28 grams of concentrated $NH_4OH$ to the balance of the slurry completed solubilization and produced 1032 grams of a dark blue solution. The solution contained 2.17 percent phosphorus, 2.84 percent copper, 3.85 percent ammonia, and 5.9 percent ammonium sulfate. Since the equivalent weight of the component acid mixture was 143, the average molecular weight of the cupric mono/dibutyl phosphate (ammonia-free) is 347.5. The cupric salt concentration, expressed on that basis, was 15.5 percent.

Cedar shingles were cut from the butt end into strips 5 inches by ½ inch. The strips were only air-dry before impregnation. Tests showed approximately 7 percent moisture removable at 50°/25 mm.

Impregnation with the copper salt solution was accomplished by immersing the solution, evacuating to 25 mm. and releasing the vacuum. The cycle was repeated five times. Four such strip impregnations were made with full-strength solution, and further impregnations were made using solution diluted to 50 and 25 percent strengths. The strips varied widely in absorptivities, varying from 50 to 100 percent weight pickup. Impregnation levels were calculated as:

$$\frac{\text{Wet pickup weight} \times \text{solution strength}}{\text{original strip weight}}$$

In this way, a graded series of impregnation levels, varying from 1.9 to 13.1 percent as cuupric mono-dibutyl phosphate (av. MW 347.5), was provided. The wet strips were then dried to constant weight at 45–50° C./25 mm. Complexed ammonia was released, depositing the less soluble copper salts within the structure of the wood.

The burning tests were conducted according to ASTM D635. In brief, this test consists of marking the specimen one inch and four inches from the end, supporting the specimen in a horizontal position with its transverse axis inclined at an angle of 45° and igniting the end with a burner. If the specimen burns to the four-inch mark, it is judged "burning by this test" and a burning rate calculated. If the specimen burns past the one-inch mark but does not reach the four-inch mark, it is judged "self-extinguishing by this test." If the specimen does not burn past the one-inch mark, it is judged "non-burning by this test." Three "burning" samples in a set of ten, regardless of the performance of the other seven, dictate a rating of "burning" for the material.

In the case of the untreated specimens, three of six burned at an average rate of 2.77 inches/minute. All of the treated specimens were non-burning.

TABLE I.—BURNING TESTS ON CEDAR SHINGLES IMPREGNATED WITH CUPRIC MONO/DIBUTYL PHOSPHATE

| A. Non-treated specimen | Burning time,[1] seconds | Burned length, inches | Rating |
|---|---|---|---|
| (a) | 63 | 3 | Burning. |
| (b) | 85 | | S.E. |
| (c) | 33 | | S.E. |
| (d) | 72 | 3 | Burning. |
| (e) | 60 | | S.E. |
| (f) | 61 | 3 | Burning. |

| B. Treated specimen | Percent Cu salt | Burning time,[1] seconds | Burned length | Rating |
|---|---|---|---|---|
| D510-141-21 | 1.93 | 27 | 0 | Non-burning. |
| D510-141-25 | 2.44 | 20 | 0 | Do. |
| D510-140-37 | 3.63 | 15 | 0 | Do. |
| D510-140-44 | 4.70 | 12 | 0 | Do. |
| D510-137-31 | 7.90 | 15 | 0 | Do. |
| D510-140-29 | 7.90 | 7 | 0 | Do. |
| D510-137-39 | 8.35 | 13 | 0 | Do. |
| D510-104-23 | 13.5 | 0 | 0 | Do. |

[1] "Burning time" reported for non-burning samples is the time the specimen flamed after the flame source was removed.

NOTE.—Average burning rate 2.77 in./min.

Example 2

One equivalent of the ammonium mono/dibutyl phosphate solution of Example 1 was precipitated by the addition of 400 grams of 25 percent aqueous zinc sulfate. The white precipitate was dissolved by the addition of ammonium hydroxide and impregnation and drying was conducted as before to produce a series of strips containing from 3.3 to 11.8 percent of the zinc salt. All strips were non-burning, with the exception of the strip at the lowest impregnation level. This strip was rated "self-extinguishing."

Example 3

Copper and zinc salt impregnations of cedar shingles were conducted as previously described. Twelve strips impregnated with the zinc salt in the range of 1.4 to 7.25 percent by weight were prepared, along with 15 strips impregnated with the copper salt at impregnation levels varying from 2.5 to 12.1 percent. Each of these strips were subjected to a severe accelerated weathering exposure comprising 10 cycles each consisting of immersion in water at 140° F. for 8 hours, followed by oven-drying at 140° F. for 16 hours. Each strip was then subjected to the burning test, ASTM D635. Of the 12 strips treated with zinc salt, 10 were "self-extinguishing," and 2 were "burning." The impregnation levels of the 2 "burning" samples were 1.5 and 1.6 percent. All of the 15 strips treated with copper salt were "self-extinguishing."

Example 4

The procedure and apparatus described for the butyl derivative was utilized for this preparation. Propylene chlorohydrin (850.5 grams, 9 moles) was charged to the flask and 426 grams (3 moles) of $P_2O_5$ was added at 50–60° in 4 hours. The mixture was held at 50° C. overnight. The equivalent weight to the phenolphthalein endpoint was 160.1. The product was soluble in an equal weight of water.

The free acid (160 grams, 1.0 equiv.) was dissolved in 400 ml. of water and treated with 59 grams (1.0 mole) of concentrated $NH_4OH$ (29% $NH_3$) to give a solution having a pH of 5. To the solution was added 323 grams (0.5 mole) of 25 percent $ZnSO_4$ solution to form a light tan slurry of the zinc salt. The salt was solubilized by the addition of 168 grams of concentrated $NH_4OH$. The turbid solution was filtered to remove suspended solids, then diluted to form a 10 percent solution of zinc mono/di(chloropropyl) phosphate (av. MW, 383.4). One portion of the solution was diluted to a 5 percent concentration and one portion to a 2.5 percent concentration. The solutions were used to impregnate cedar strips. Eighteen strips, varying in add-on from 1.3 to 21.0 percent were prepared and subjected to the weathering test of Example 3. All of the strips were "self-extinguishing."

Example 5

Example 4 was repeated, using zinc bis(2,3-dibromopropyl) phosphate as the metallic-organic phosphate. All strips produced were rated "non-burning" in the test.

Example 6

Mixed mono/dibutyl phosphoric acid, prepared as in Example 1 (486 grams), was treated with 284 grams of gaseous chlorine at 30–50° C. under ultraviolet activation. The weight increase was 135 grams and the equivalent weight of the product was 143 after dissolved gases were stripped under vacuum. After washing with an equal weight of water, and drying, the equivalent weight was 154.

One gram equivalent of this acid (154 grams) was dissolved in 400 grams of water and 59 grams of 29 percent $NH_4OH$. The solution was further diluted to 1856 grams with water to produce a 10 percent solution of the mixed salt.

Cedar shingles were impregnated with ammoniacal solutions as described previously to provide a series of strips varying in dry add-on from 3 to 12 percent by weight. After subjection to the severe weathering conditions of Example 3, the standard burning test resulted in a rating of "self-extinguishing" for all samples. Maximum burning length was one inch.

Example 7

Mixed mono-diphenyl phosphoric acid was prepared by treating 988 grams of molten phenol gradually with 497 grams of $P_2O_5$ under $N_2$ at 50–55° C. Heating was continued until the $P_2O_5$ was substantially dissolved. The product (Neutral equiv. 184.5) gradually crystallized in storage.

The product was dissolved in ammonium hydroxide solution, precipitated with $ZnSO_4$, and redissolved with ammonia as usual.

Impregnation and weathering was carried out as before. Of 11 strips varying in add-on from 3 to 13 percent, all were rated "self-extinguishing." The maximum burn-length was 1.25 inches.

Obviously, the examples can be multiplied indefinitely, without departing from the scope of the invention, which is defined in the claims.

What is claimed is:

1. The method of fireproofing a cellulose structure which comprises preparing an aqueous solution of an ammonia complex of a neutral salt of a heavy metal capable of complexing with ammonia and a partial ester of phosphoric acid in which 1 to 2 of the active hydrogens of phosphoric acid is replaced by the residue of an alcohol or phenol, said residues when alkyl containing an average of 4 to 6 carbon atoms each when unsubstituted or alkoxy-substituted and at least 3 carbon atoms when halo-substituted with chlorine or bromine, and containing no more carbon atoms per residue than indicated by the formula C atoms minus Cl atoms minus 2(Br) atoms=6 for alkyls and C atoms minus Cl atoms minus 2(Br) atoms=10 for aryls absorbing sufficient solution into the cellulosic structure to impart flame-retardant properties thereto, and evaporating the bulk of the water and sufficient ammonia from the complex to precipitate the water-insoluble metallic-organic phosphate to produce a fire-retardant structure resistant to leaching by water.

2. The method of claim 1 in which the heavy metal is zinc.

3. The method of claim 1 in which the heavy metal is copper.

4. The method of claim 1 in which the organic residues are substituted with chlorine or bromine.

5. The method of claim 1 in which the heavy metal is zinc or copper and the organic groups are selected from N-butyl, phenyl, chlorinated propyl, chlorinated butyl, and brominated propyl.

References Cited
UNITED STATES PATENTS 3,650,820   3/1972   DiPictro   117—136

WILLIAM D. MARTIN, Primary Examiner

J. A. BELL, Assistant Examiner

U.S. Cl. X.R.

106—15 FP; 117—137; 252—8.1

UNITED STATES PATENT OFFICE
CERTIFICATE OF CORRECTION

Patent No. 3,740,264  Dated June 19, 1973

Inventor(s) Charles Andrew Lynch, Jr., Edward Francis Orwoll

It is certified that error appears in the above-identified patent and that said Letters Patent are hereby corrected as shown below:

Column 1, line 31, "nit" should read --not--.

Column 1, line 67, "filame" should read --flame--.

Column 2, line 3, "ot" should read --to--.

Column 2, line 31, "alcolol" should read --alcohol--.

Column 3, line 38, "in turn less" should read --in turn dipping less--.

Column 4, line 63, "cuupric" should read --cupric--.

Table 1, Column 5, line 14, "specimen" should read --Specimens--.

Table 1, Column 5, line 21, "specimen" should read --Specimens--.

Table 1, Column 5, line 27, "13.5" should read --13.1--.

Column 5, line 46, "desecribed" should read --described--.

Column 6, line 73, "aryls" should read --aryls,--.

Signed and sealed this 1st day of January 1974.

(SEAL)
Attest:

EDWARD M. FLETCHER, JR.
Attesting Officer

RENE D. TEGTMEYER
Acting Commissioner of Patents